(12) United States Patent
Xia et al.

(10) Patent No.: US 8,773,811 B2
(45) Date of Patent: Jul. 8, 2014

(54) SYSTEMS AND METHODS FOR ZONE SERVO TIMING GAIN RECOVERY

(75) Inventors: Haitao Xia, San Jose, CA (US); Ming Jin, Fremont, CA (US); Dahua Qin, Allentown, PA (US); Shaohua Yang, San Jose, CA (US)

(73) Assignee: LSI Corporation, San Jose, CA (US)

( * ) Notice: Subject to any disclaimer, the term of this patent is extended or adjusted under 35 U.S.C. 154(b) by 204 days.

(21) Appl. No.: 13/316,899

(22) Filed: Dec. 12, 2011

(65) Prior Publication Data

US 2013/0148226 A1 Jun. 13, 2013

(51) Int. Cl.
*G11B 5/54* (2006.01)

(52) U.S. Cl.
USPC ............... 360/78.14; 360/75; 360/32; 360/39

(58) Field of Classification Search
USPC .................. 360/32, 39, 55, 78.14, 65, 26, 75, 360/77.05, 77.08
See application file for complete search history.

(56) References Cited

U.S. PATENT DOCUMENTS

| | | | |
|---|---|---|---|
| 4,777,544 A | 10/1988 | Brown et al. | |
| 5,130,866 A | 7/1992 | Klaassen et al. | |
| 5,237,325 A | 8/1993 | Klein et al. | |
| 5,278,703 A | 1/1994 | Rub et al. | |
| 5,309,357 A | 5/1994 | Stark et al. | |
| 5,341,249 A | 8/1994 | Abbott et al. | |
| 5,377,058 A | 12/1994 | Good et al. | |
| 5,521,948 A | 5/1996 | Takeuchi | |
| 5,523,902 A | 6/1996 | Pederson | |
| 5,594,341 A | 1/1997 | Majidi-Ahy | |
| 5,629,912 A * | 5/1997 | Okawa et al. | 369/44.29 |
| 5,668,679 A | 9/1997 | Swearingen et al. | |
| 5,696,639 A | 12/1997 | Spurbeck et al. | |
| 5,768,044 A | 6/1998 | Hetzler | |
| 5,781,129 A | 7/1998 | Schwartz et al. | |
| 5,798,885 A | 8/1998 | Saiki et al. | |

(Continued)

FOREIGN PATENT DOCUMENTS

| | | |
|---|---|---|
| FR | 2904168 A1 | 1/2008 |
| WO | WO 03/047091 | 6/2003 |
| WO | WO 2008/009620 | 1/2008 |

OTHER PUBLICATIONS

Annampedu, V. et al fiAdaptive Algorithms for Asynchronous Detection of Coded Servo Signals Based on Interpolationfl, IEEE Transactions on Magnetics, vol. 41, No. 10, Oct. 2005.

(Continued)

*Primary Examiner* — Thomas Alunkal
(74) *Attorney, Agent, or Firm* — Hamilton DeSanctis & Cha

(57) ABSTRACT

Various embodiments of the present invention provide systems and methods for data processing. As an example, a data processing system is disclosed that includes Various embodiments of the present invention provide data processing systems that include an analog to digital converter circuit and a phase and gain computation circuit. The analog to digital converter circuit is operable to convert an analog input into a series of digital samples. At least a portion of the series of digitals samples represent a periodic signal from a servo data region. The phase and gain computation circuit is operable to: determine an approximate amplitude of the periodic signal based at least in part upon the digital samples representing the periodic signal from the servo data region; determine a gain based at least in part on the approximate amplitude; and determine a phase based at least in part on the approximate amplitude.

20 Claims, 5 Drawing Sheets

(56) References Cited

U.S. PATENT DOCUMENTS

| | | |
|---|---|---|
| 5,835,295 A | 11/1998 | Behrens |
| 5,844,920 A | 12/1998 | Zook et al. |
| 5,852,524 A | 12/1998 | Glover et al. |
| 5,892,632 A | 4/1999 | Behrens |
| 5,955,783 A | 9/1999 | Ben-Efraim |
| 5,970,104 A | 10/1999 | Zhong et al. |
| 5,986,830 A | 11/1999 | Hein |
| 5,987,562 A | 11/1999 | Glover |
| 6,009,549 A | 12/1999 | Bliss et al. |
| 6,023,383 A | 2/2000 | Glover et al. |
| 6,069,583 A | 5/2000 | Silvestrin et al. |
| 6,081,397 A | 6/2000 | Belser |
| 6,111,710 A * | 8/2000 | Feyh et al. ............. 360/46 |
| 6,111,712 A | 8/2000 | Vishakhadatta et al. |
| 6,181,505 B1 * | 1/2001 | Sacks et al. ............ 360/77.08 |
| 6,208,478 B1 | 3/2001 | Chiu et al. |
| 6,269,058 B1 | 7/2001 | Yamanoi et al. |
| 6,278,591 B1 | 8/2001 | Chang |
| 6,400,518 B1 | 6/2002 | Bhaumik et al. |
| 6,404,829 B1 | 6/2002 | Sonu |
| 6,411,452 B1 | 6/2002 | Cloke |
| 6,441,661 B1 | 8/2002 | Aoki et al. |
| 6,476,989 B1 | 11/2002 | Chainer et al. |
| 6,490,110 B2 | 12/2002 | Reed et al. |
| 6,493,162 B1 | 12/2002 | Fredrickson |
| 6,519,102 B1 | 2/2003 | Smith et al. |
| 6,530,060 B1 | 3/2003 | Vis et al. |
| 6,587,292 B1 * | 7/2003 | Ashley et al. ............ 360/39 |
| 6,603,622 B1 | 8/2003 | Christiansen et al. |
| 6,606,048 B1 | 8/2003 | Sutardja |
| 6,633,447 B2 | 10/2003 | Franck et al. |
| 6,646,822 B1 | 11/2003 | Tuttle et al. |
| 6,657,802 B1 | 12/2003 | Ashley et al. |
| 6,671,404 B1 | 12/2003 | Kawatani |
| 6,717,764 B2 | 4/2004 | Lake |
| 6,775,529 B1 | 8/2004 | Roo |
| 6,788,484 B2 | 9/2004 | Honma |
| 6,813,108 B2 | 11/2004 | Annampedu et al. |
| 6,816,328 B2 | 11/2004 | Rae |
| 6,839,014 B2 | 1/2005 | Uda |
| 6,856,183 B2 | 2/2005 | Annampedu |
| 6,865,040 B2 | 3/2005 | Fayeulle et al. |
| 6,876,511 B2 | 4/2005 | Koyanagi |
| 6,906,990 B2 | 6/2005 | Nagata et al. |
| 6,912,099 B2 | 6/2005 | Annampedu et al. |
| 6,963,521 B2 | 11/2005 | Hayashi |
| 6,980,382 B2 | 12/2005 | Hirano et al. |
| 6,999,257 B2 | 2/2006 | Takeo |
| 6,999,264 B2 | 2/2006 | Ehrlich |
| 6,999,404 B2 | 2/2006 | Furumiya et al. |
| 7,002,767 B2 | 2/2006 | Annampedu et al. |
| 7,016,131 B2 | 3/2006 | Liu et al. |
| 7,038,875 B2 | 5/2006 | Lou et al. |
| 7,054,088 B2 | 5/2006 | Yamazaki et al. |
| 7,072,137 B2 | 7/2006 | Chiba |
| 7,082,005 B2 | 7/2006 | Annampedu et al. |
| 7,092,462 B2 | 8/2006 | Annampedu et al. |
| 7,116,504 B1 | 10/2006 | Oberg |
| 7,126,776 B1 | 10/2006 | Warren, Jr. et al. |
| 7,133,227 B2 | 11/2006 | Chiang et al. |
| 7,136,250 B1 | 11/2006 | Wu et al. |
| 7,154,689 B1 | 12/2006 | Shepherd et al. |
| 7,158,464 B2 | 1/2007 | Gushima et al. |
| 7,167,328 B2 | 1/2007 | Annampedu et al. |
| 7,180,693 B2 | 2/2007 | Annampedu et al. |
| 7,187,739 B2 | 3/2007 | Ma |
| 7,191,382 B2 | 3/2007 | James et al. |
| 7,193,544 B1 | 3/2007 | Fitelson et al. |
| 7,193,798 B2 | 3/2007 | Byrd et al. |
| 7,199,961 B1 | 4/2007 | Wu et al. |
| 7,203,013 B1 | 4/2007 | Han et al. |
| 7,203,015 B2 | 4/2007 | Sakai et al. |
| 7,203,017 B1 | 4/2007 | Sutardja et al. |
| 7,206,146 B2 | 4/2007 | Flynn et al. |
| 7,230,789 B1 | 6/2007 | Brunnett et al. |
| 7,248,425 B2 | 7/2007 | Byun et al. |
| 7,253,984 B1 | 8/2007 | Patapoutian et al. |
| 7,265,937 B1 | 9/2007 | Erden et al. |
| 7,286,313 B2 | 10/2007 | Erden et al. |
| 7,301,717 B1 | 11/2007 | Lee et al. |
| 7,308,057 B1 | 12/2007 | Patapoutian |
| 7,323,916 B1 | 1/2008 | Sidiropoulos et al. |
| 7,362,536 B1 | 4/2008 | Liu et al. |
| 7,375,918 B1 | 5/2008 | Shepherd et al. |
| 7,394,608 B2 | 7/2008 | Eleftheriou |
| 7,411,531 B2 | 8/2008 | Aziz et al. |
| 7,420,498 B2 | 9/2008 | Barrenscheen |
| 7,423,827 B2 | 9/2008 | Neville |
| 7,446,690 B2 | 11/2008 | Kao |
| 7,525,460 B1 | 4/2009 | Liu et al. |
| 7,529,320 B2 | 5/2009 | Byrne et al. |
| 7,558,177 B2 | 7/2009 | Ogura et al. |
| 7,602,567 B2 | 10/2009 | Park |
| 7,602,568 B1 | 10/2009 | Katchmart |
| 7,616,395 B2 | 11/2009 | Yamamoto |
| 7,620,101 B1 | 11/2009 | Jenkins |
| 7,630,155 B2 | 12/2009 | Maruyama et al. |
| 7,643,235 B2 | 1/2010 | Erden et al. |
| 7,656,982 B2 | 2/2010 | Gaedke |
| 7,679,850 B2 | 3/2010 | Smith |
| 7,693,243 B2 | 4/2010 | Chen et al. |
| 7,738,200 B2 | 6/2010 | Annampedu |
| 7,768,437 B2 | 8/2010 | Annampedu |
| 7,768,730 B2 | 8/2010 | Bliss et al. |
| 7,796,480 B2 | 9/2010 | Cheng et al. |
| 7,813,065 B2 | 10/2010 | Annampedu |
| 7,821,730 B2 | 10/2010 | Cao |
| 7,835,104 B2 | 11/2010 | Yamashita |
| 7,889,823 B2 | 2/2011 | Yang |
| 7,929,237 B2 | 4/2011 | Grundvig |
| 8,014,099 B2 | 9/2011 | Mathew |
| 8,054,573 B2 | 11/2011 | Mathew |
| 8,054,931 B2 | 11/2011 | Annampedu |
| 8,059,349 B2 | 11/2011 | Annampedu |
| 8,098,451 B2 | 1/2012 | Graef |
| 8,102,960 B2 | 1/2012 | Ran et al. |
| 8,107,573 B2 | 1/2012 | Chang |
| 8,154,818 B2 | 4/2012 | Mathew |
| 8,154,972 B2 | 4/2012 | Ratnakar Aravind |
| 8,174,784 B2 | 5/2012 | Grundvig |
| 8,174,949 B2 | 5/2012 | Ratnakar Aravind |
| 8,237,597 B2 | 8/2012 | Liu |
| 8,243,381 B2 | 8/2012 | Annampedu |
| 8,254,049 B2 | 8/2012 | Annampedu |
| 8,261,171 B2 | 9/2012 | Annampedu |
| 2001/0001585 A1 * | 5/2001 | Takahashi ............... 360/77.08 |
| 2002/0150179 A1 | 10/2002 | Leis et al. |
| 2002/0159350 A1 * | 10/2002 | Ogura et al. ............ 369/47.35 |
| 2003/0002189 A1 * | 1/2003 | Ozdemir ............... 360/51 |
| 2003/0030930 A1 * | 2/2003 | Sugawara et al. ........ 360/48 |
| 2004/0252394 A1 * | 12/2004 | Hamaguchi et al. ....... 360/48 |
| 2005/0243455 A1 | 11/2005 | Annampedu |
| 2006/0132953 A1 * | 6/2006 | Asakura et al. .......... 360/48 |
| 2007/0104300 A1 | 5/2007 | Esumi et al. |
| 2008/0056403 A1 | 3/2008 | Wilson |
| 2009/0142620 A1 | 6/2009 | Yamamoto et al. |
| 2009/0274247 A1 | 11/2009 | Galbraith et al. |
| 2010/0061490 A1 | 3/2010 | Noelder |
| 2010/0067628 A1 | 3/2010 | Buehner |
| 2010/0142078 A1 | 6/2010 | Annampedu |
| 2010/0149940 A1 * | 6/2010 | Nakata et al. ........... 369/53.34 |
| 2011/0002211 A1 * | 1/2011 | Ratnakar Aravind ...... 369/59.19 |
| 2011/0043938 A1 | 2/2011 | Mathew |
| 2011/0157737 A1 | 6/2011 | Grundvig |
| 2011/0209026 A1 | 8/2011 | Xia et al. |
| 2012/0036173 A1 | 2/2012 | Annampedu |
| 2012/0084336 A1 | 4/2012 | Yang |
| 2012/0106607 A1 | 5/2012 | Miladinovic |
| 2012/0120784 A1 | 5/2012 | Yang |
| 2012/0124241 A1 | 5/2012 | Yang |
| 2012/0134042 A1 | 5/2012 | Annampedu |
| 2012/0134043 A1 | 5/2012 | Annampedu |

(56) References Cited

U.S. PATENT DOCUMENTS

2012/0155587 A1  6/2012  Annampedu
2012/0182643 A1  7/2012  Zhang
2012/0236428 A1  9/2012  Xia

OTHER PUBLICATIONS

Aziz and Annampedu, fiInterpolation Based Maximum-Likelihood(ML) Detection of Asynchronous Servo Repeatable Run Out (RRO) Datafl, Digest, IEEE Intl Magnetics Conf., vol. 42, N.

Aziz and Annampedu, fiAsynchronous Maximum Likelihood (ML) Detection of Servo repeatable Run Out (RRO) Datafl Magnetics Conf. IEEE International 5/2006.

J. Hagenauer and P. Hoeher, fiA Viterbi algorithm with soft-decision outputs and its applications,fl in Proc. IEEE Global Telecommunications Conference 1989, Dallas, Texas, No.

Kryder, M. et al "Heat Assisted Magnetic Recording" Proc. IEEE, vol. 96, No. 11, p. 1810, Nov. 2008.

Polikar, Robi "Ensemble Based Systems in Decision Making" IEEE Circuits and Systems Magazine Third qtr 2006, p. 21-47.

U.S. Appl. No. 13/242,983, filed Sep. 23, 2011, Jeffrey P. Grundvig, Unpublished.

U.S. Appl. No. 13/173,088, filed Jun. 30, 2011, Jeffrey P. Grundvig, Unpublished.

U.S. Appl. No. 13/100,021, filed May 3, 2011, Haitao Xia, Unpublished.

U.S. Appl. No. 13/096,873, filed Apr. 28, 2011, Ross S. Wilson, Unpublished.

U.S. Appl. No. 13/186,267, filed Jul. 19, 2011, Haitao Xia, Unpublished.

Weller et al "Thermal Limits in Ultrahigh-density Magnetic Recording" IEEE Trans. Magn. vol. 35, No. 6, p. 4423, Nov. 1999.

\* cited by examiner

SYSTEMS AND METHODS FOR ZONE
SERVO TIMING GAIN RECOVERY

BACKGROUND OF THE INVENTION

The present inventions are related to systems and methods for data processing, and more particularly to systems and methods for servo data processing.

Data storage devices often include servo data regions interspersed with user data regions. The servo data regions include a variety of data that may be used for location identification and clock synchronization. It is desired to increase the density of the information maintained in the servo regions to allow for increased storage space supported by a given data storage device. Currently, the data rate of servo data on the inside diameter of the storage medium is the same as that on the outside diameter of the storage medium. Maintaining a common data rate results in a very high density near the inside diameter of the storage medium and a very low density on the outside diameter of the storage medium. Such a high density of the information in the servo regions reduces the signal to noise ratio for data retrieved from the servo regions near the inside diameter of the storage medium, and wastes space near the outside diameter of the storage medium.

Hence, for at least the aforementioned reasons, there exists a need in the art for advanced systems and methods for stored data processing.

BRIEF SUMMARY OF THE INVENTION

The present inventions are related to systems and methods for data processing, and more particularly to systems and methods for servo data processing.

Various embodiments of the present invention provide data processing systems that include an analog to digital converter circuit and a phase and gain computation circuit. The analog to digital converter circuit is operable to convert an analog input into a series of digital samples. At least a portion of the series of digitals samples represent a periodic signal from a servo data region. The phase and gain computation circuit is operable to: determine an approximate amplitude of the periodic signal based at least in part upon the digital samples representing the periodic signal from the servo data region; determine a gain based at least in part on the approximate amplitude; and determine a phase based at least in part on the approximate amplitude. In some cases, the data processing system is implemented as an integrated circuit. In various cases, the data processing system is implemented as part of a data storage device.

In some instances of the aforementioned embodiments, determining the approximate amplitude includes calculating a cosine amplitude value and a sine amplitude value based upon the digital samples. In some cases, determining the gain is done by performing a direct calculation in accordance with the following equation:

$$\frac{A_{target}}{\sqrt{(A'_{cos})^2 + (A'_{sin})^2}}$$

where $A'_{cos}$ is the cosine amplitude value, $A'_{sin}$ is the sine amplitude value, and $A_{target}$ is a user programmable target value. In various cases, determining the phase includes iteratively calculating an approximation of the phase based at least in part on the cosine amplitude and the sine amplitude. In one or more cases, determining the gain includes iteratively calculating an approximation of the gain based at least in part on the cosine amplitude and the sine amplitude. In some cases, the systems further include a lookup table operable to maintain a plurality of pre-calculated gain values. In such cases, determining the gain includes accessing the lookup table using the cosine amplitude and the sine amplitude to obtain a corresponding one of the plurality of pre-calculated gain values. In some cases, the systems further include a lookup table operable to maintain a plurality of pre-calculated phase values. In such cases, determining the phase includes accessing the lookup table using the cosine amplitude and the sine amplitude to obtain a corresponding one of the plurality of pre-calculated phase values.

In various instances of the aforementioned embodiments, the system further includes a combined linear interpolator and equalizer circuit. The combined linear interpolator and equalizer circuit is operable to: generate a first interpolated and equalized version of a data set derived from the digital samples representing the periodic signal from the servo data region based at least in part on the phase; and generate a second interpolated and equalized version of the data set derived from the digital samples representing the periodic signal from the servo data region based at least in part on the phase modified by an offset. In some such cases, the combined linear interpolator and equalizer circuit includes: a first digital finite impulse response filter circuit using a first set of coefficients derived from a lookup table based upon the phase; and a second digital finite impulse response filter circuit using a second set of coefficients derived from the lookup table based upon the phase modified by the offset. In various cases, the data processing system further includes a multiplier circuit operable to multiply the digital samples representing the periodic signal from the servo data region by the gain to yield the data set derived from the digital samples representing the periodic signal from the servo data region. In one or more cases, the data processing system further includes a comparator circuit operable to compare the gain with a programmable threshold. In such cases, the data set derived from the digital samples representing the periodic signal from the servo data region is the digital samples representing the periodic signal from the servo data region when the gain is greater than the programmable threshold. In various cases, the data processing system further includes: a first servo address mark detector circuit operable to identify a servo address mark pattern in the first interpolated and equalized version of the data set to yield a first servo address mark output; a second servo address mark detector circuit operable to identify the servo address mark pattern in the second interpolated and equalized version of the data set to yield a second servo address mark output; and a selector circuit operable to provide one of the first servo address mark output and the second servo address mark output as an identified servo address mark.

Other embodiments of the present invention provide methods for data processing in a storage device. Such methods include: receiving a series of digital samples derived from a servo data region of a storage device; determining an approximate amplitude of a periodic signal represented by the series of digital samples by calculating a cosine amplitude value and a sine amplitude value based upon the digital samples; determining a gain based at least in part on the approximate amplitude; and determining a phase based at least in part on the approximate amplitude.

Yet other embodiments of the present invention provide data storage devices that include: a storage medium, a read/write head assembly, an analog to digital converter circuit, and a read channel circuit. The storage medium maintains information including servo data. The read/write head assembly is operable to sense the information and to provide a corresponding analog signal, and the analog to digital converter circuit is operable to sample the analog signal to yield a series of digital samples corresponding to the servo data. The read channel circuit includes a phase and gain computation. The phase gain computation circuit is operable to: determine an approximate amplitude of a periodic signal represented by the series of digital samples by calculating a cosine amplitude value and a sine amplitude value based upon the digital samples; determine a gain based at least in part on the approximate amplitude; and determine a phase based at least in part on the approximate amplitude.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 2b shows a zone based disk platter that may be used in relation to the storage system of FIG. 2a;

DETAILED DESCRIPTION OF THE INVENTION

The present inventions are related to systems and methods for data processing, and more particularly to systems and methods for servo data processing.

Various embodiments of the present invention provide systems and methods for locating information on a storage medium. Such systems and methods determine a phase and gain of a series of synchronizing data to yield a sampling phase and a gain. The sampling phase and gain are used in relation to a linear interpolation and equalization circuit that provides a plurality of interpolated data corresponding to different phases. Identification data is identified in each of the plurality of interpolated data to yield corresponding identification data outputs to a selector circuit. The selector circuit selects one of the identification data outputs to provide to a downstream processing circuit.

Figure 1:
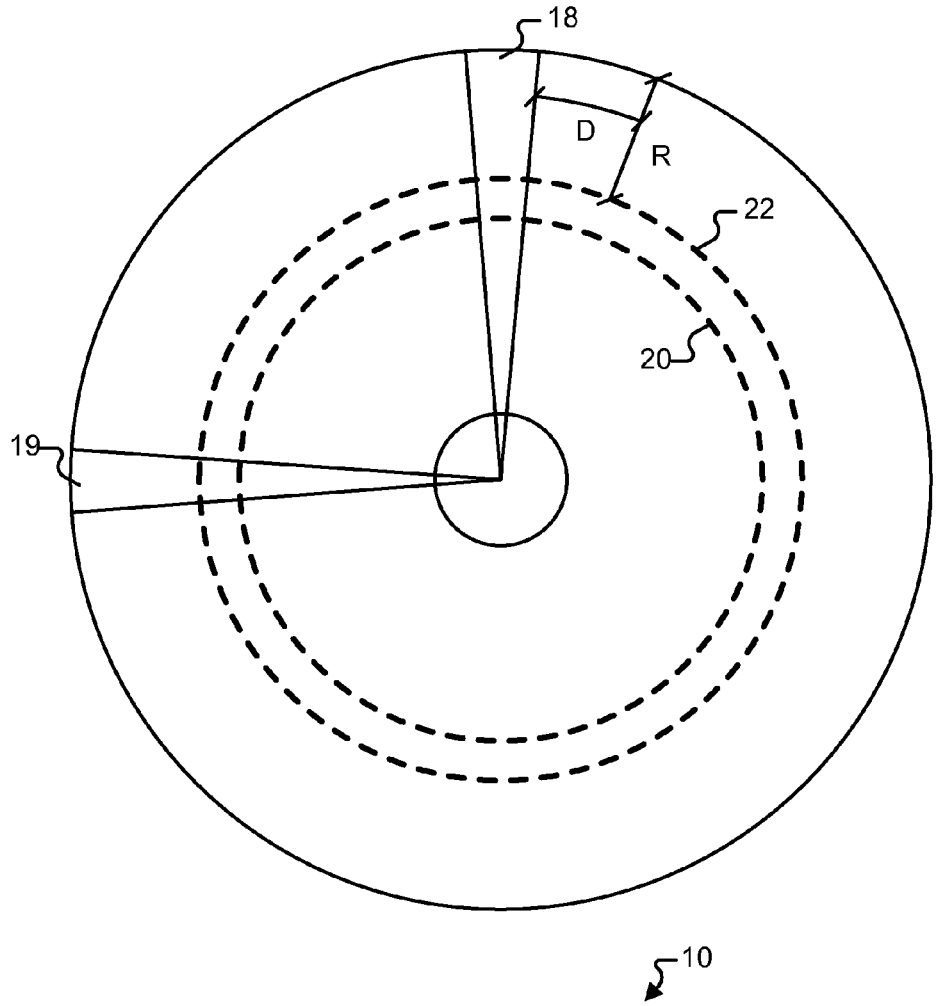
FIG. 1 is a block diagram of a known magnetic storage medium and sector data scheme.

Turning to FIG. 1, a storage medium 1 is shown with two exemplary tracks 20, 22 indicated as dashed lines. The tracks are segregated by servo data written within wedges 19, 18. These wedges include servo data 10 that are used for control and synchronization of a read/write head assembly over a desired location on storage medium 1. In particular, this servo data generally includes a preamble pattern 11 followed by a servo address mark 12 (SAM). Servo address mark 12 is followed by a wedge ID information field 13 and a Gray code 14. Gray code 14 is followed by one or more burst information fields 30, 31, 32, 33. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information fields 30, 31, 32, 33. Between the servo data bit patterns 10a and 10b, a user data region 16 is provided. There may be two types of servo burst—the first is called amplitude split servo bursts that can include four to six bursts written with certain offset to servo track, and the second is called null bursts.

Figure 2A:
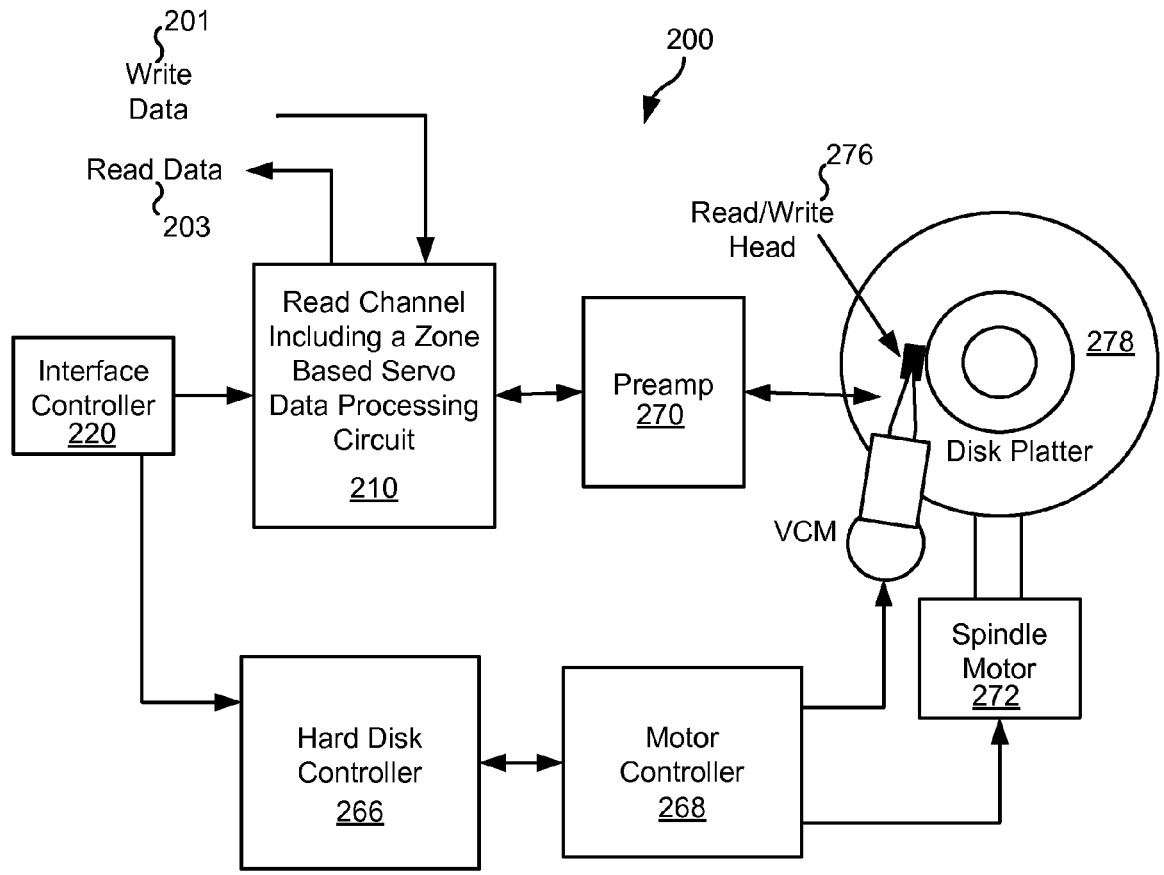
FIG. 2a shows a storage system including a read channel circuit with an enhanced servo data processing circuit in accordance with some embodiments of the present invention.

Turning to FIG. 2a, a storage system 200 including a read channel circuit 210 with a zone based servo data processing circuit is shown in accordance with some embodiments of the present invention. Storage system 200 may be, for example, a hard disk drive. Storage system 200 also includes a preamplifier 270, an interface controller 220, a hard disk controller 266, a motor controller 268, a spindle motor 272, a disk platter 278, and a read/write head 276. Interface controller 220 controls addressing and timing of data to/from disk platter 278. The data on disk platter 278 consists of groups of magnetic signals that may be detected by read/write head assembly 276 when the assembly is properly positioned over disk platter 278. In one embodiment, disk platter 278 includes magnetic signals recorded in accordance with either a longitudinal or a perpendicular recording scheme.

In a typical read operation, read/write head assembly 276 is accurately positioned by motor controller 268 over a desired data track on disk platter 278. The desired track is identified in part using the zone based servo data processing circuit. Motor controller 268 both positions read/write head assembly 276 in relation to disk platter 278 and drives spindle motor 272 by moving read/write head assembly to the proper data track on disk platter 278 under the direction of hard disk controller 266. Spindle motor 272 spins disk platter 278 at a determined spin rate (RPMs). Once read/write head assembly 278 is positioned adjacent the proper data track, magnetic signals representing data on disk platter 278 are sensed by read/write head assembly 276 as disk platter 278 is rotated by spindle motor 272. The sensed magnetic signals are provided as a continuous, minute analog signal representative of the magnetic data on disk platter 278. This minute analog signal is transferred from read/write head assembly 276 to read channel module 264 via preamplifier 270. Preamplifier 270 is operable to amplify the minute analog signals accessed from disk platter 278. In turn, read channel circuit 210 decodes and digitizes the received analog signal to recreate the information originally written to disk platter 278. This data is provided as read data 203 to a receiving circuit. As part of decoding the received information, read channel circuit 210 performs timing recovery on the received data stream using a reduced format timing recovery circuit. The zone based servo data processing circuit may be implemented similar to that described below in relation to FIG. 3 and/or FIG. 4, and/or may operate in accordance with the method discussed below in relation to FIG. 5. A write operation is substantially the opposite of the preceding read operation with write data 201 being provided to read channel circuit 210. This data is then encoded and written to disk platter 278.

Figure 2B:
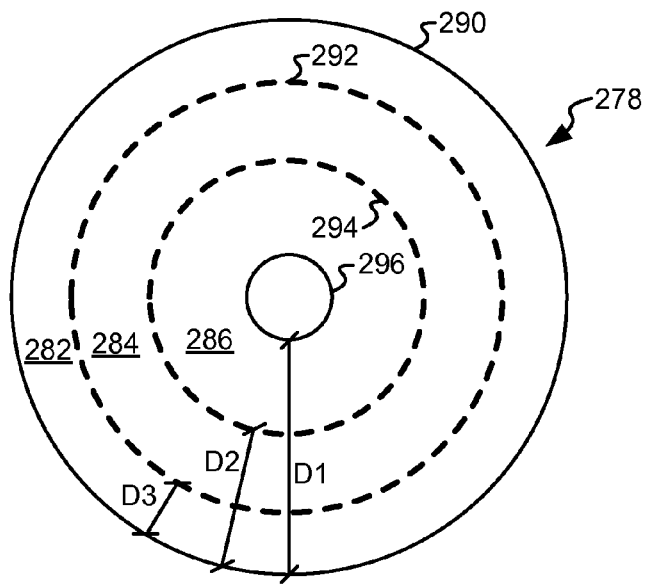

Disk platter 278 is a multi-zone disk platter, an example of which is shown in FIG. 2b. As shown in the example, disk platter has three zones 282, 284, 285. In particular, zone 282 covers the area of disk platter 278 that extends from an outer diameter 290 to an interim diameter 292 a distance D3 from outer diameter 290. Zone 284 covers the area of disk platter 278 that extends from interim diameter 292 to an interim diameter 294 a distance D2 from outer diameter 290. Zone 286 covers the area of disk platter 278 that extends from interim diameter 294 to an inner diameter 296 a distance D1 from outer diameter 290.

In the prior art, the rate of processing servo data was the same from outer diameter 290 to inner diameter 296 resulting in high density servo data on tracks near inner diameter 296, and low density servo data on tracks near outer diameter 290. The difference in servo data density from outer diameter 290 to inner diameter 296 complicates data processing circuit design as overall disk densities continue to increase. In contrast, the rate of processing servo data varies across each of zones 282, 284, 286. As such, the servo data in zone 282 near interim diameter 292 is relatively high compared with servo data in zone 282 near outer diameter 290, the servo data in zone 284 near interim diameter 294 is relatively high compared with servo data in zone 284 near interim diameter 292, and the servo data in zone 286 near inner diameter 296 is relatively high compared with servo data in zone 286 near interim diameter 294. However, by treating disk 278 as zones with different servo data rates, the change in servo data density from outer diameter 290 to inner diameter 296 is not as extreme as that evidenced where the same servo data rate is used across the entire medium.

It should be noted that storage system 200 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 200, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

Figure 3:
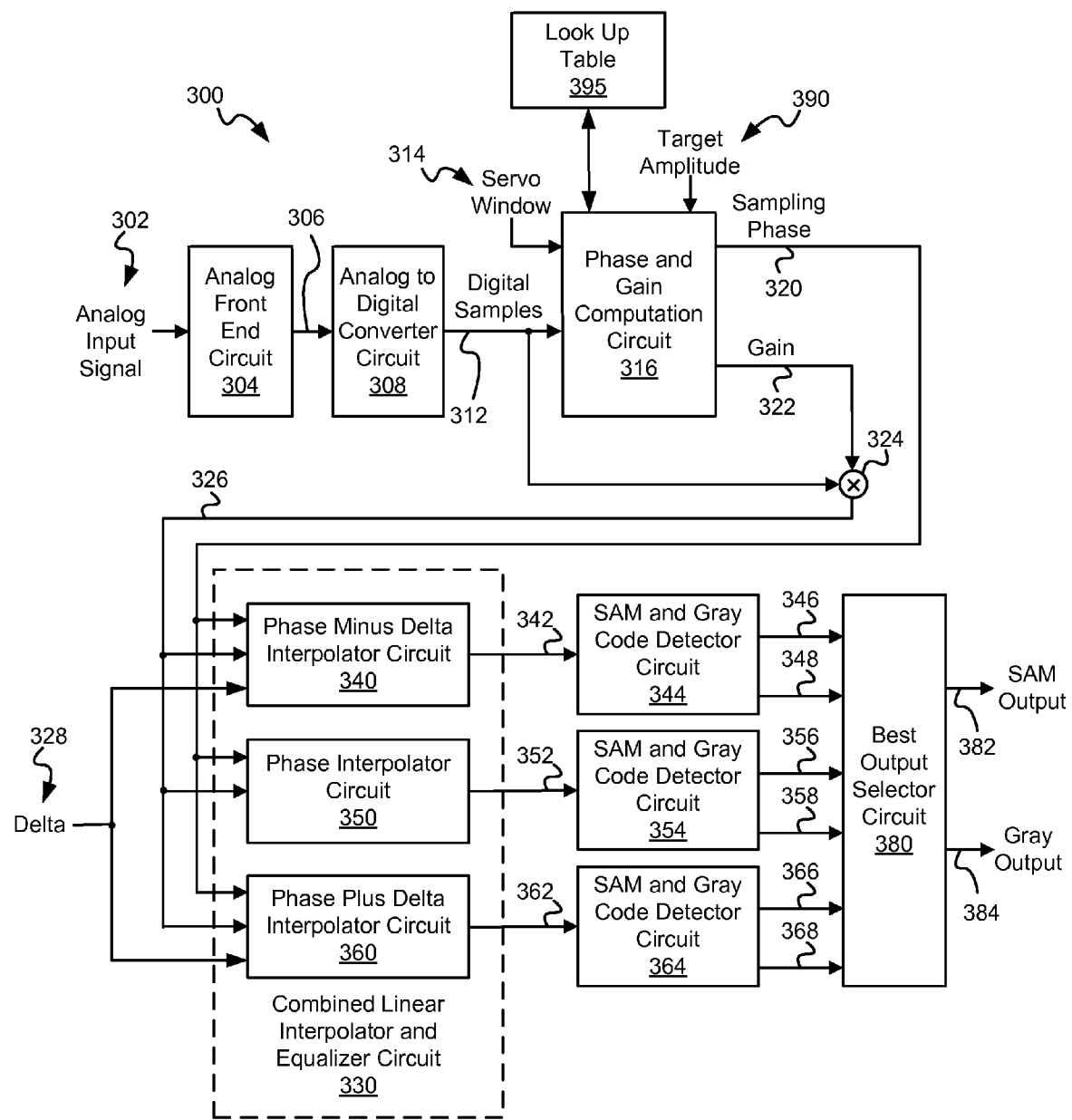
FIG. 3 depicts a zone based servo data processing circuit in accordance with one or more embodiments of the present invention.

Turning to FIG. 3, a zone based servo data processing circuit 300 is shown in accordance with one or more embodiments of the present invention. Zone based servo data processing circuit 300 includes an analog front end circuit 304 that receives an analog input signal 302 and provides a corresponding analog output signal 306. Analog front end circuit 304 may include any circuitry known in the art that is capable of receiving an analog input signal and providing a modified analog signal as an output. In one particular instance, analog front end circuit 304 includes an amplifier (not shown) that receives and amplifies analog input signal 302 and an analog filter (not shown) that reduces any noise exhibited at the output of the amplifier. Based upon the disclosure provided herein, one of ordinary skill in the art will recognize a variety of circuitry that may be included in analog front end circuit 304 in accordance with different embodiments of the present invention.

Analog output signal 306 is provided to an analog to digital converter circuit 308. Analog to digital converter circuit 308 provides a series of digital samples 312 representing analog output signal 306. Digital samples 312 are synchronized to a sample clock (not shown) that is provided to analog to digital converter circuit 308. Analog to digital converter circuit 308 may be any circuit or system known in the art that is capable of converting a continuous signal into a series of digital samples. Analog input signal 306 is a continuous signal representing a number of bit periods. The bit periods recur with a periodicity of T, and the sample clock causes analog to digital converter circuit 308 to generate a number of samples of analog input signal 302 for each period T. In one particular embodiment of the present invention, four samples are generated for each period T. In another embodiment of the present invention, four samples are generated for each period T. It should be noted that other numbers of samples per period may be generated. Based upon the disclosure provided herein, one of ordinary skill in the art will recognize a variety of sampling frequencies and corresponding bit periods that may be used in relation to different embodiments of the present invention. Analog input signal 302 may be derived from a variety of sources. For example, analog input signal 302 may be received from a read/write head assembly (not shown) disposed in relation to a storage medium (not shown). Based upon the disclosure provided herein, one of ordinary skill in the art will recognize a variety of other sources of analog input signal 302.

Digital samples 312 are provided to a phase and gain computation circuit 316 that is operable to calculate a sampling phase and gain of a preamble represented by a number of digital samples 312 when a servo window signal 314 is asserted. Servo window signal 314 is asserted whenever a servo data region of a storage device is being processed, and is de-asserted when intervening user data regions are not being processed. To determine gain and sampling phase, phase and gain computation circuit 316 uses digital samples 312 corresponding to a preamble to calculate a cosine ($A'_{cos}$) and a sine ($A'_{sin}$) of the amplitude in accordance with the following equations:

$$A'_{cos} = \sum_{k=0}^{[\text{acquisition length}/4]-1} (x_{4k+1} - x_{4k+3}),$$

$$A'_{sin} = \sum_{k=0}^{[\text{aquisition length}/4]-1} (x_{4k+2} - x_{4k+4}),$$

where the acquisition length corresponds to the number of samples received that correspond to the received preamble, and x represents respective preamble samples. Where a 4T sample clock is used (i.e., generating four samples per period T of the preamble), an amplitude is calculated in accordance with the following equation:

$$A_{actual} = \sqrt{(A'_{cos})^2 + (A'_{sin})^2}.$$

From this, a gain 322 is calculated in accordance with the following equation:

$$\text{Gain} = \frac{A_{target}}{A_{actual}},$$

where $A_{target}$ is a user selectable amplitude value provided as a target amplitude input 390. Gain 322 and digital samples 312 are provided to a multiplier circuit 324 that multiplies each sample value of digital samples 312 by gain 322 to yield an amplitude modified sample output 326.

A sampling phase 320 is calculated in accordance with the following equation:

$$\text{Sampling Phase} = \arctan\left(\frac{A'_s}{A'_c}\right).$$

In this embodiment of the present invention, the aforementioned arctan calculation is done using a look up table 395. In particular, look up table 395 is addressed by $A'_{cos}$ and $A'_{sin}$. In response to the address, look up table 395 provides a pre-calculated arctan value corresponding to the address.

Sampling phase 320 is provided to a combination linear interpolator and equalizer circuit 330 where it is used to interpolate and equalize amplitude modified sample output 326. The function of combination linear interpolator and equalizer circuit 330 is to do linear interpolation as well as equalization to remove noise from amplitude modified sample output 326 to improve detection of servo data including servo address mark (SAM) and Gray code data. In one particular implementation, combination linear interpolator and equalizer circuit 330 is implemented as a three digital finite impulse response filters respectively used to implement a phase minus delta interpolator circuit 340, a phase interpolator circuit 350, and a phase plus delta interpolator circuit 360. Phase minus delta interpolator circuit 340 interpolates amplitude modified sample output 326 based upon sampling phase 320 less a user programmable offset, delta 328. Phase interpolator circuit 350 interpolates amplitude modified sample output 326 based upon sampling phase 320. Phase plus delta interpolator circuit 360 interpolates amplitude modified sample output 326 based upon sampling phase 320 less delta 328. Each of the digital finite impulse response filters use pre-calculated coefficients from a look up table (not shown) that is addressed by sampling phase 320 and delta 328. The aforementioned coefficients are computed based on the knowledge of channel characteristics up front. Delta 328 defines a range over which a best phase is searched to combat radio incoherence as well as servo frequency offset which may cause estimated sampling phase error.

Phase minus delta interpolator circuit 340, phase interpolator circuit 350, and phase plus delta interpolator circuit 360 operate in parallel to yield respective interpolated and equalized sample sets. In particular, phase minus delta interpolator circuit 340 provides a phase minus sample set 342 to a SAM and Gray code detector circuit 344, phase interpolator circuit 350 provides a non-offset sample set 352 to a SAM and Gray code detector circuit 354, and phase plus delta interpolator circuit 360 provides a phase plus sample set 362 to a SAM and Gray code detector circuit 364. Each of SAM and Gray code detector circuit 344, SAM and Gray code detector circuit 354, and SAM and Gray code detector circuit 364 may be any circuit know in the art that is capable of identifying a SAM and Gray code in a servo data pattern. SAM and Gray code detector circuit 344 queries phase minus sample set 342 to identify a SAM pattern and a Gray code pattern. Where a SAM pattern is identified it is provided as a SAM output 346, and where a Gray code pattern is identified it is identified as a Gray code output 348. SAM and Gray code detector circuit 354 queries non-offset sample set 352 to identify a SAM pattern and a Gray code pattern. Where a SAM pattern is identified it is provided as a SAM output 356, and where a Gray code pattern is identified it is identified as a Gray code output 358. SAM and Gray code detector circuit 364 queries phase plus sample set 362 to identify a SAM pattern and a Gray code pattern. Where a SAM pattern is identified it is provided as a SAM output 366, and where a Gray code pattern is identified it is identified as a Gray code output 368. In some cases, zone based servo data processing circuit 300 may be modified to bypass multiplier circuit 324 for digital samples 312 corresponding to SAM and Gray code data succeeding the preamble to reduce delay in processing the SAM and Gray code data.

SAM output 346, Gray code output 348, SAM output 356, Gray code output 358, SAM output 366, and Gray code output 368 are provided to an output selector circuit 390. Output selector circuit 380 selects one of SAM output 346, SAM output 356, or SAM output 366 to be provided as a SAM output 382; and selects one of Gray code output 348, Gray code output 358, or Gray code output 368 to be provided as a Gray code output 384. In one particular embodiment of the present invention, output selector circuit 480 performs its selection based upon whichever of SAM output 346, SAM output 356, or SAM output 366 exhibits the greatest difference between minimum and maximum amplitude values. Based upon the disclosure provided herein, one of ordinary skill in the art will recognize other criteria for selection. Gray code output 384 and SAM output 382 are provided to a downstream processing circuit (not shown).

Figure 4:
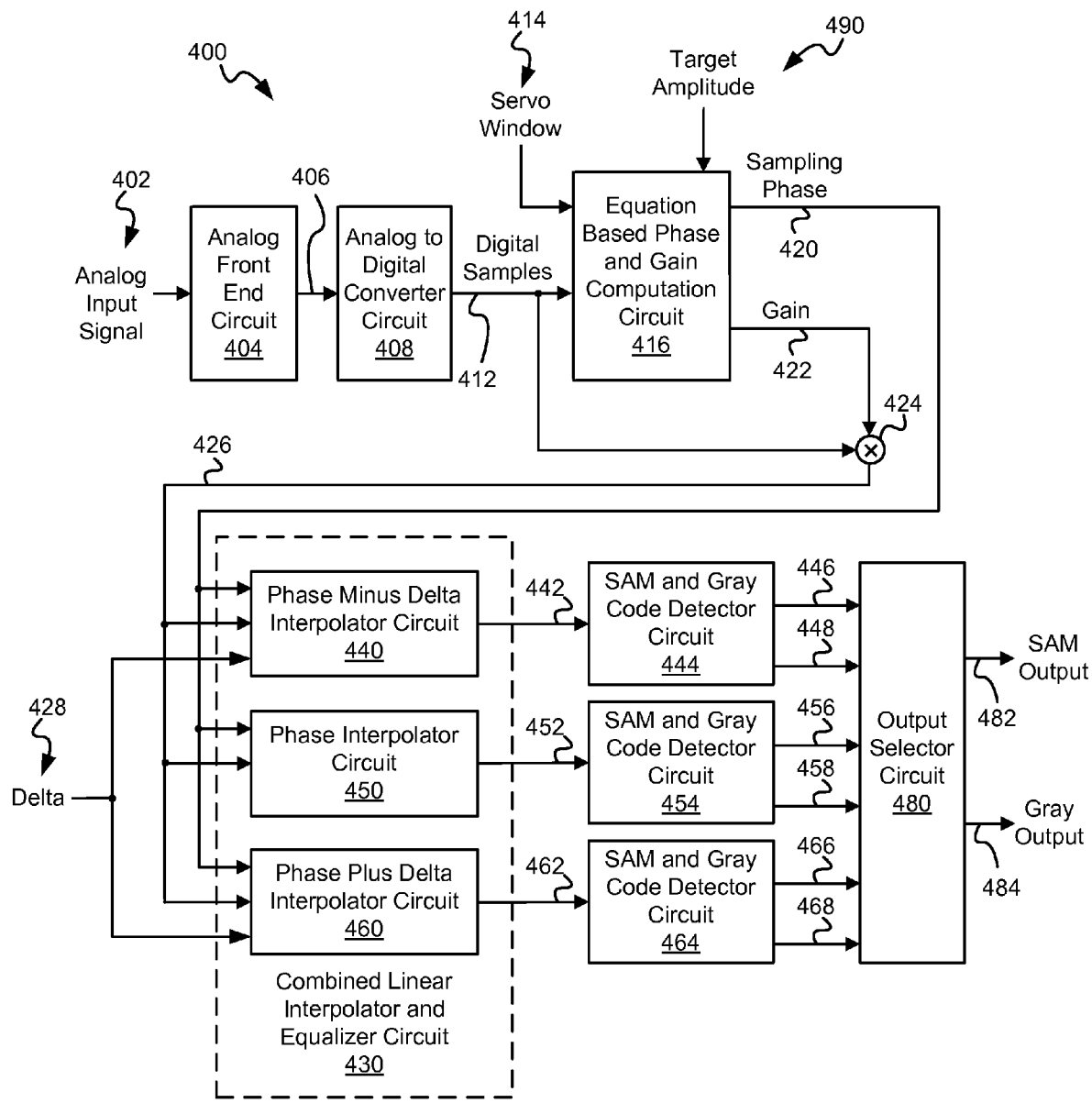
FIG. 4 depicts another zone based servo data processing circuit in accordance with one or more embodiments of the present invention.

Turning to FIG. 4, depicts another zone based servo data processing circuit 400 in accordance with one or more embodiments of the present invention. Zone based servo data processing circuit 400 includes an analog front end circuit 404 that receives an analog input signal 402 and provides a corresponding analog output signal 406. Analog front end circuit 404 may include any circuitry known in the art that is capable of receiving an analog input signal and providing a modified analog signal as an output. In one particular instance, analog front end circuit 404 includes an amplifier (not shown) that receives and amplifies analog input signal 402 and an analog filter (not shown) that reduces any noise exhibited at the output of the amplifier.

Based upon the disclosure provided herein, one of ordinary skill in the art will recognize a variety of circuitry that may be included in analog front end circuit 404 in accordance with different embodiments of the present invention.

Analog output signal 406 is provided to an analog to digital converter circuit 408. Analog to digital converter circuit 408 provides a series of digital samples 412 representing analog output signal 406. Digital samples 412 are synchronized to a sample clock (not shown) that is provided to analog to digital converter circuit 408. Analog to digital converter circuit 408 may be any circuit or system known in the art that is capable of converting a continuous signal into a series of digital samples. Analog input signal 406 is a continuous signal representing a number of bit periods. The bit periods recur with a periodicity of T, and the sample clock causes analog to digital converter circuit 408 to generate a number of samples of analog input signal 402 for each period T. In one particular embodiment of the present invention, four samples are generated for each period T. In another embodiment of the present invention, four samples are generated for each period T. It should be noted that other numbers of samples per period may be generated. Based upon the disclosure provided herein, one of ordinary skill in the art will recognize a variety of sampling frequencies and corresponding bit periods that may be used in relation to different embodiments of the present invention. Analog input signal 402 may be derived from a variety of sources. For example, analog input signal 402 may be received from a read/write head assembly (not shown) disposed in relation to a storage medium (not shown). Based upon the disclosure provided herein, one of ordinary skill in the art will recognize a variety of other sources of analog input signal 402.

Digital samples 412 are provided to an equation based phase and gain computation circuit 416 that is operable to calculate a sampling phase and gain of a preamble represented by a number of digital samples 412 when a servo window signal 414 is asserted. Servo window signal 414 is asserted whenever a servo data region of a storage device is being processed, and is de-asserted when intervening user data regions are not being processed. To determine gain and sampling phase, equation based phase and gain computation circuit 416 uses digital samples 412 corresponding to a preamble to calculate a cosine ($A'_{cos}$) and a sine ($A'_{sin}$) of the amplitude in accordance with the following equations:

$$A'_{cos} = \sum_{k=0}^{[acquisition\ length/4]-1} (x_{4k+1} - x_{4k+3}),$$

$$A'_{sin} = \sum_{k=0}^{[acquisition\ length/4]-1} (x_{4k+2} - x_{4k+4}),$$

where the acquisition length corresponds to the number of samples received that correspond to the received preamble, and x represents respective preamble samples. Where a 4T sample clock is used (i.e., generating four samples per period T of the preamble), an amplitude is calculated in accordance with the following equation:

$$A_{actual} = \sqrt{(A'_{cos})^2 + (A'_{sin})^2}.$$

From this, a gain 422 is calculated in accordance with the following equation:

$$Gain = \frac{A_{target}}{A_{actual}},$$

where $A_{target}$ is a user selectable amplitude value provided as a target amplitude input 490. Gain 422 and digital samples 412 are provided to a multiplier circuit 424 that multiplies each sample value of digital samples 412 by gain 422 to yield an amplitude modified sample output 426.

A sampling phase 420 is calculated in accordance with the following equation:

$$Sampling\ Phase = \arctan\left(\frac{A'_s}{A'_c}\right).$$

In some embodiments of the present invention, the aforementioned arctan calculation may be done directly by a computation circuit included as part of equation based phase and gain calculation circuit 416. Direct calculation of the aforementioned equation is hardware intensive. Thus, other embodiments of the present invention use an iterative calculation that requires less hardware and provides reasonably accurate results. Such an iterative calculation may be done in accordance with the following pseudocode:

$$A_{cos}(0) = \max(A'_{cos}, A'_{sin}) + \min(A'_{cos}, A'_{sin});$$

$$A_{sin}(0) = \min(A'_{cos}, A'_{sin}) - \max(A'_{cos}, A'_{sin});$$

$$phase(0) = \frac{\pi}{4} = 128(8\ bits),\ \arctan(2^{-k})LUT = \{76, 40, 20, 10, 5, 3, 1, 1\}\ for\ i = 1\ to\ 8;$$

Iterations: execute 2 iterations every cycle for $$(i = 1;\ i < iterations;\ i = i + 2)$$
*execute two iterations on each cycle i*

$$\begin{cases} if\ (A_{sin}(i-1) < 0\ and\ [A_{sin}(i-1) + A_{cos}(i-1) \gg i] < 0) \\ A_{cos}(i+1) = A_{cos}(i-1) - (A_{sin}(i-1) \gg i) - (A_{sin}(i-1) \gg i+1) - (A_{cos}(i-1) \gg 2i+1) \\ A_{sin}(i+1) = A_{sin}(i-1) + (A_{cos}(i-1) \gg i) + (A_{cos}(i-1) \gg i+1) - (A_{sin}(i-1) \gg 2i+1) \\ phase(i+1) = phase(i-1) - \arctan(2^{-i}) - \arctan(2^{-(i+1)})\} \\ if\ (A_{sin}(i-1) < 0\ and\ [A_s(i-1) + A_c(i-1) \gg i] \geq 0) \\ A_{cos}(i+1) = A_{cos}(i-1) - (A_{sin}(i-1) \gg i) + (A_{sin}(i-1) \gg i+1) + (A_{cos}(i-1) \gg 2i+1) \\ A_{sin}(i+1) = A_{sin}(i-1) + (A_{cos}(i-1) \gg i) - (A_{cos}(i-1) \gg i+1) + (A_{sin}(i-1) \gg 2i+1) \\ phase(i+1) = phase(i-1) - \arctan(2^{-i}) + \arctan(2^{-(i+1)})\} \\ if\ (A_{sin}(i-1) \geq 0\ and\ [A_{sin}(i-1) - A_c(i-1)] \gg i < 0) \\ A_{cos}(i+1) = A_{cos}(i-1) + (A_{sin}(i-1) \gg i) - (A_{sin}(i-1) \gg i+1) + (A_{cos}(i-1) \gg 2i+1) \\ A_{sin}(i+1) = A_{sin}(i-1) - (A_{cos}(i-1) \gg i) + (A_{cos}(i-1) \gg i+1) + (A_{sin}(i-1) \gg 2i+1) \\ phase(i+1) = phase(i-1) + \arctan(2^{-i}) - \arctan(2^{-(i+1)})\} \\ if\ (A_{sin}(i-1) \geq 0\ and\ [A_{sin}(i-1) - A_{cos}(i-1) \gg i] \geq 0) \\ \begin{cases} A_{cos}(i+1) = A_{cos}(i-1) + (A_{sin}(i-1) \gg i) + (A_{sin}(i-1) \gg i+1) - (A_{cos}(i-1) \gg 2i+1) \\ A_{sin}(i+1) = A_{sin}(i-1) - (A_{cos}(i-1) \gg i) - (A_{cos}(i-1) \gg i+1) - (A_{sin}(i-1) \gg 2i+1) \\ phase(i+1) = phase(i-1) + \arctan(2^{-i}) + \arctan(2^{-(i+1)}) \end{cases} \end{cases}$$

where i represents the period of each of digital samples 412. The final phase value (i.e., phase(i+1)) after all iterations are complete is sampling phase 420. The final amplitude values ($A_{sin}$(i+1) and $A_{cos}$(i+1)) may be used in the following amplitude equation:

$$A_{actual} = (A'_{cos})^2 + (A'_{sin})^2,$$

from which gain 422 may be calculated as discussed above. In some cases, gain 422 may be compared against a programmable threshold, and where it is too large it can be set equal to one (1).

Sampling phase 420 is provided to a combination linear interpolator and equalizer circuit 430 where it is used to interpolate and equalize amplitude modified sample output 426. The function of combination linear interpolator and equalizer circuit 430 is to do linear interpolation as well as equalization to remove noise from amplitude modified sample output 426 to improve detection of servo data including servo address mark (SAM) and Gray code data. In one particular implementation, combination linear interpolator and equalizer circuit 430 is implemented as a three digital finite impulse response filters respectively used to implement a phase minus delta interpolator circuit 440, a phase interpolator circuit 450, and a phase plus delta interpolator circuit 460. Phase minus delta interpolator circuit 440 interpolates amplitude modified sample output 426 based upon sampling phase 420 less a user programmable offset, delta 428. Phase interpolator circuit 450 interpolates amplitude modified sample output 426 based upon sampling phase 420. Phase plus delta interpolator circuit 460 interpolates amplitude modified sample output 426 based upon sampling phase 420 less delta 428. Each of the digital finite impulse response filters use pre-calculated coefficients from a look up table (not shown) that is addressed by sampling phase 420 and delta 428. The aforementioned coefficients are computed based on the knowledge of channel characteristics up front. Delta 428 defines a range over which a best phase is searched to combat radio incoherence as well as servo frequency offset which may cause estimated sampling phase error.

Phase minus delta interpolator circuit 440, phase interpolator circuit 450, and phase plus delta interpolator circuit 460 operate in parallel to yield respective interpolated and equalized sample sets. In particular, phase minus delta interpolator circuit 440 provides a phase minus sample set 442 to a SAM and Gray code detector circuit 444, phase interpolator circuit 450 provides a non-offset sample set 452 to a SAM and Gray code detector circuit 454, and phase plus delta interpolator circuit 460 provides a phase plus sample set 462 to a SAM and Gray code detector circuit 464. Each of SAM and Gray code detector circuit 444, SAM and Gray code detector circuit 454, and SAM and Gray code detector circuit 464 may be any circuit know in the art that is capable of identifying a SAM and Gray code in a servo data pattern. SAM and Gray code detector circuit 444 queries phase minus sample set 442 to identify a SAM pattern and a Gray code pattern. Where a SAM pattern is identified it is provided as a SAM output 446, and where a Gray code pattern is identified it is identified as a Gray code output 448. SAM and Gray code detector circuit 454 queries non-offset sample set 452 to identify a SAM pattern and a Gray code pattern. Where a SAM pattern is identified it is provided as a SAM output 456, and where a Gray code pattern is identified it is identified as a Gray code output 458. SAM and Gray code detector circuit 464 queries phase plus sample set 462 to identify a SAM pattern and a Gray code pattern. Where a SAM pattern is identified it is provided as a SAM output 466, and where a Gray code pattern is identified it is identified as a Gray code output 468. In some cases, zone based servo data processing circuit 400 may be modified to bypass multiplier circuit 424 for digital samples 412 corresponding to SAM and Gray code data succeeding the preamble to reduce delay in processing the SAM and Gray code data.

SAM output 446, Gray code output 448, SAM output 456, Gray code output 458, SAM output 466, and Gray code output 468 are provided to an output selector circuit 490. Output selector circuit 480 selects one of SAM output 446, SAM output 456, or SAM output 466 to be provided as a SAM output 482; and selects one of Gray code output 448, Gray code output 458, or Gray code output 468 to be provided as a Gray code output 484. In one particular embodiment of the present invention, output selector circuit 480 performs its selection based upon whichever of SAM output 446, SAM output 456, or SAM output 466 exhibits the greatest difference between minimum and maximum amplitude values. Based upon the disclosure provided herein, one of ordinary skill in the art will recognize other criteria for selection. Gray code output 484 and SAM output 482 are provided to a downstream processing circuit (not shown).

Figure 5:
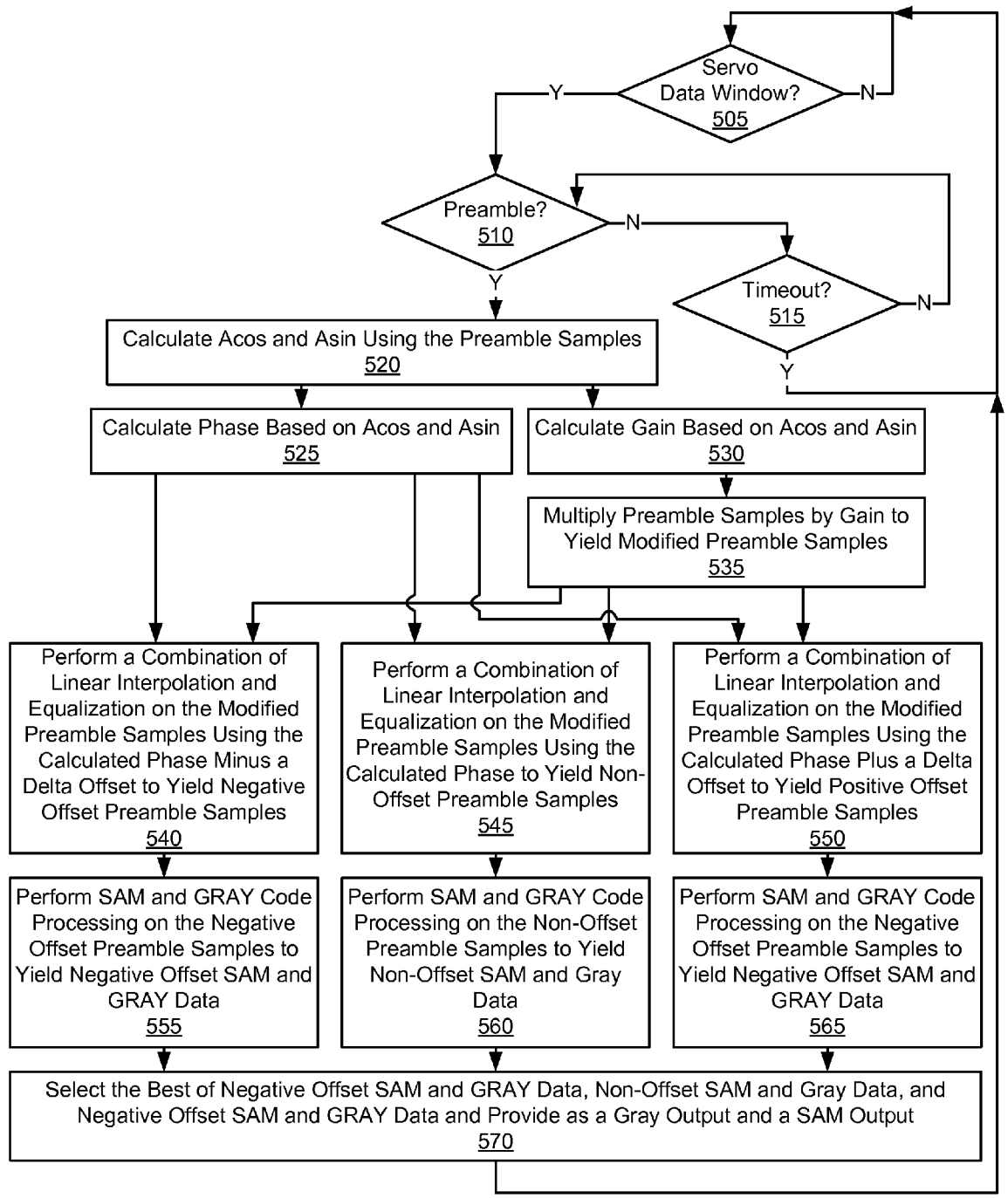
FIG. 5 shows a flow diagram of a method in accordance with some embodiments of the present invention for performing servo data processing.

Turning to FIG. 5, a flow diagram 500 shows a method in accordance with some embodiments of the present invention for performing servo data processing. Following flow diagram 500, it is determined whether data samples from a servo data region are being received (block 505). This may be done, for example, based upon an assertion level of a servo window input. Where servo data is being received (block 505), it is determined whether the receive samples correspond to a preamble of the servo data (block 510). This involves performing some level of preamble detection and synchronization as is known in the art. Where the preamble has not been identified (block 510), it is determined whether a timeout has occurred (block 515). Such a timeout condition may be indicated, for example, by determining whether a servo window input remains asserted. Where a timeout condition is identified (block 515), the process begins again by waiting for the next servo data region (block 505).

Otherwise, where a preamble is identified (block 510), a cosine ($A'_{cos}$) and a sine ($A'_{sin}$) of the amplitude are calculated using the preamble samples in accordance with the following equations:

$$A'_{cos} = \sum_{k=0}^{[acquisition\ length/4]-1} (x_{4k+1} - x_{4k+3}),$$

$$A'_{sin} = \sum_{k=0}^{[acquisition\ length/4]-1} (x_{4k+2} - x_{4k+4}),$$

where the acquisition length corresponds to the number of samples received that correspond to the received preamble, and x represents respective preamble samples (block 520). The aforementioned amplitude values are used to calculate a phase in accordance with the following equation:

$$Sampling\ Phase = \arctan\left(\frac{A'_s}{A'_c}\right).$$

(block 525). This equation may be calculated either directly or interactively similar to that discussed above in relation to FIG. 4. In parallel, where a 4T sample clock is used (i.e., generating four samples per period T of the preamble), an amplitude is calculated in accordance with the following equation:

$$A_{actual} = (A'_{cos})^2 + (A'_{sin})^2.$$

From this amplitude value, a gain can be calculated (block 530). Gain may be calculated in accordance with the following equation:

$$\text{Gain} = \frac{A_{target}}{A_{actual}},$$

where $A_{target}$ is a user programmable target value. The received preamble values are multiplied by the gain value to yield modified preamble samples (block 535).

A combination linear interpolation and equalization is performed on the modified preamble samples using the previously calculated phase less a user programmable delta value to yield negative offset preamble samples that are both interpolated and equalized (block 540). In one particular implementation, the combination linear interpolation and equalization is done using a finite impulse response filter. The coefficients for the digital finite response filter may be pre-calculated and stored to a look up table where they are accessed based upon the phase and delta value. The aforementioned coefficients are computed based on the knowledge of channel characteristics up front, and the delta value defines a range over which a best phase is searched to combat radio incoherence as well as servo frequency offset which may cause estimated sampling phase error. Similarly, a combination linear interpolation and equalization is performed on the modified preamble samples using the previously calculated phase without offset to yield non-offset preamble samples that are both interpolated and equalized (block 545). Again, a digital finite impulse response filter relying on pre-calculated coefficients may be used to perform the combination linear interpolation and equalization. In addition, a combination linear interpolation and equalization is performed on the modified preamble samples using the previously calculated phase plus the user programmable delta value to yield positive offset preamble samples that are both interpolated and equalized (block 550). Again, a digital finite impulse response filter relying on pre-calculated coefficients may be used to perform the combination linear interpolation and equalization.

SAM and Gray code processing is performed on the negative offset preamble samples to identify both SAM information and Gray code information subsequent to the preamble (block 555). The SAM and Gray processing may be done using any SAM/Gray Code detector circuit known in the art. Similarly, SAM and Gray code processing is performed on the non-offset preamble samples to identify both SAM information and Gray code information subsequent to the preamble (block 560), and SAM and Gray code processing is performed on the positive offset preamble samples to identify both SAM information and Gray code information subsequent to the preamble (block 565). Again, the SAM and Gray processing may be done using any SAM/Gray Code detector circuit known in the art. The best of positive offset SAM and Gray code information, negative offset SAM and Gray code information, and non-offset SAM and Gray code information is selected and provided as SAM and Gray code data (block 570). In one particular embodiment of the present invention, the aforementioned selection is based upon whichever SAM output (positive offset, negative offset, or non-offset) exhibits the greatest difference between minimum and maximum amplitude values. Based upon the disclosure provided herein, one of ordinary skill in the art will recognize other criteria for selection.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for performing servo data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the system comprising:
an analog to digital converter circuit operable to convert an analog input into a series of digital samples, wherein at least a portion of the series of digitals samples represent a periodic signal from a servo data region;
a phase and gain computation circuit operable to:
determine an approximate amplitude of the periodic signal based at least in part upon the digital samples representing the periodic signal from the servo data region;
determine a gain based at least in part on the approximate amplitude; and
determine a phase based at least in part on the approximate amplitude: and
a combined linear interpolator and equalizer circuit operable to:
generate a first interpolated and equalized version of a data set derived from the digital samples representing the periodic signal from the servo data region based at least in part on the phase; and
generate a second interpolated and equalized version of the data set derived from the digital samples representing the periodic signal from the servo data region based at least in part on the phase modified by an offset.

2. The data processing system of claim 1, wherein determining the approximate amplitude includes calculating a cosine amplitude value and a sine amplitude value based upon the digital samples.

3. The data processing system of claim 2, wherein determining the gain is done by performing a direct calculation in accordance with the following equation:

$$\frac{A_{target}}{\sqrt{(A'_{cos})^2 + (A'_{sin})^2}}$$

wherein $A'_{cos}$ is the cosine amplitude value, $A'_{sin}$ is the sine amplitude value, and $A_{target}$ is a user programmable target value.

4. The data processing system of claim 2, wherein determining the phase includes iteratively calculating an approximation of the phase based at least in part on the cosine amplitude and the sine amplitude.

5. The data processing system of claim 2, wherein determining the gain includes iteratively calculating an approximation of the gain based at least in part on the cosine amplitude and the sine amplitude.

6. The data processing system of claim 2, wherein the system further comprises:
a lookup table operable to maintain a plurality of pre-calculated gain values; and
wherein determining the gain includes accessing the lookup table using the cosine amplitude and the sine amplitude to obtain a corresponding one of the plurality of pre-calculated gain values.

7. The data processing system of claim 2, wherein the system further comprises:
a lookup table operable to maintain a plurality of pre-calculated phase values; and
wherein determining the phase includes accessing the lookup table using the cosine amplitude and the sine amplitude to obtain a corresponding one of the plurality of pre-calculated phase values.

8. The data processing system of claim 1, wherein the combined linear interpolator and equalizer circuit comprises:
a first digital finite impulse response filter circuit using a first set of coefficients derived from a lookup table based upon the phase; and
a second digital finite impulse response filter circuit using a second set of coefficients derived from the lookup table based upon the phase modified by the offset.

9. The data processing system of claim 1, wherein the data processing system further comprises:
a multiplier circuit operable to multiply the digital samples representing the periodic signal from the servo data region by the gain to yield the data set derived from the digital samples representing the periodic signal from the servo data region.

10. The data processing system of claim 1, wherein the data processing system further comprises:
a comparator circuit operable to compare the gain with a programmable threshold, wherein the data set derived from the digital samples representing the periodic signal from the servo data region is the digital samples representing the periodic signal from the servo data region when the gain is greater than the programmable threshold.

11. The data processing system of claim 1, wherein the data processing system further comprises:
a first servo address mark detector circuit operable to identify a servo address mark pattern in the first interpolated and equalized version of the data set to yield a first servo address mark output;
a second servo address mark detector circuit operable to identify the servo address mark pattern in the second interpolated and equalized version of the data set to yield a second servo address mark output; and
a selector circuit operable to provide one of the first servo address mark output and the second servo address mark output as an identified servo address mark.

12. The data processing system of claim 1, wherein the data processing system is implemented as an integrated circuit.

13. The data processing system of claim 1, wherein the data processing system is implemented as part of a data storage device.

14. A method for data processing in a storage device, the method comprising:
receiving a series of digital samples derived from a servo data region of a storage device;
determining an approximate amplitude of a periodic signal represented by the series of digital samples by calculating a cosine amplitude value and a sine amplitude value based upon the digital samples;
determining a gain based at least in part on the approximate amplitude;
determining a phase based at least in part on the approximate amplitude; and
using a combined linear interpolator and equalizer circuit to:
generate a first interpolated and equalized version of a data set derived from the digital samples representing the periodic signal from the servo data based at least in part on the phase; and
generate a second interpolated and equalized version of the data set derived from the digital samples representing the periodic signal from the servo data based at least in part on the phase modified by an offset.

15. A storage device, the storage device comprising:
a storage medium maintaining information including servo data;
a read/write head assembly operable to sense the information and to provide a corresponding analog signal;
an analog to digital converter circuit operable to sample the analog signal to yield a series of digital samples corresponding to the servo data;
a read channel circuit including a phase and gain computation circuit operable to:
determine an approximate amplitude of a periodic signal represented by the series of digital samples by calculating a cosine amplitude value and a sine amplitude value based upon the digital samples;
determine a gain based at least in part on the approximate amplitude; and
determine a phase based at least in part on the approximate amplitude: and wherein the read channel circuit further comprises:
a combined linear interpolator and equalizer circuit operable to:
generate a first interpolated and equalized version of a data set derived from the digital samples representing the periodic signal from the servo data based at least in part on the phase; and
generate a second interpolated and equalized version of the data set derived from the digital samples representing the periodic signal from the servo data based at least in part on the phase modified by an offset.

16. The storage device of claim 15, wherein determining the phase includes iteratively calculating an approximation of the phase based at least in part on the cosine amplitude and the sine amplitude, and wherein determining the gain includes iteratively calculating an approximation of the gain based at least in part on the cosine amplitude and the sine amplitude.

17. The data storage device of claim 15, wherein the read channel circuit further comprises:

a lookup table operable to maintain a plurality of pre-calculated gain values and a plurality of pre-calculated phase values;
wherein determining the gain includes accessing the lookup table using the cosine amplitude and the sine amplitude to obtain a corresponding one of the plurality of pre-calculated gain values; and
wherein determining the phase includes accessing the lookup table using the cosine amplitude and the sine amplitude to obtain a corresponding one of the plurality of pre-calculated phase values.

18. The storage device of claim 15, wherein the combined linear interpolator and equalizer circuit comprises:
a first digital finite impulse response filter circuit using a first set of coefficients derived from a lookup table based upon the phase; and
a second digital finite impulse response filter circuit using a second set of coefficients derived from the lookup table based upon the phase modified by the offset.

19. The storage device of claim 15, wherein the data processing system further comprises:
a multiplier circuit operable to multiply the digital samples representing the periodic signal from the servo data region by the gain to yield the data set derived from the digital samples representing the periodic signal from the servo data region.

20. The storage device of claim 15, wherein the data processing system further comprises:
a comparator circuit operable to compare the gain with a programmable threshold, wherein the data set derived from the digital samples representing the periodic signal from the servo data region is the digital samples representing the periodic signal from the servo data region when the gain is greater than the programmable threshold.

* * * * *